United States Patent
Provost et al.

(10) Patent No.: US 8,991,574 B2
(45) Date of Patent: Mar. 31, 2015

(54) APPARATUS FOR REDUCING VIBRATIONS IN A VEHICLE

(75) Inventors: Stephen B. Provost, Phoenix, AZ (US); Kelly Michael Banks, Glendale, AZ (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 756 days.

(21) Appl. No.: 12/487,825

(22) Filed: Jun. 19, 2009

(65) Prior Publication Data
US 2010/0320046 A1 Dec. 23, 2010

(51) Int. Cl.
F16F 7/10 (2006.01)
F16F 7/01 (2006.01)
F16F 7/116 (2006.01)

(52) U.S. Cl.
CPC ............... *F16F 7/015* (2013.01); *F16F 7/116* (2013.01)
USPC .......................................... 188/380; 188/268

(58) Field of Classification Search
USPC .......... 188/268, 378, 379, 380; 267/136, 178, 267/179
See application file for complete search history.

(56) References Cited

U.S. PATENT DOCUMENTS

| | | | | |
|---|---|---|---|---|
| 989,958 A | * | 4/1911 | Frahm ........................... | 188/380 |
| 2,016,207 A | * | 10/1935 | Lindenberg ................... | 296/1.03 |
| 2,018,870 A | * | 10/1935 | Paton ............................ | 296/1.03 |
| 2,157,820 A | * | 5/1939 | Fleck ............................. | 267/166 |
| 2,417,347 A | * | 3/1947 | Brown .......................... | 188/268 |
| 2,797,931 A | * | 7/1957 | Hans ............................. | 280/758 |
| 2,854,100 A | * | 9/1958 | Oiley et al. ................... | 188/316 |
| 2,887,071 A | * | 5/1959 | Settles ....................... | 105/392.5 |
| 4,697,781 A | | 10/1987 | Hamano et al. | |
| 6,298,963 B1 | * | 10/2001 | Kim .............................. | 188/379 |
| 6,547,049 B1 | * | 4/2003 | Tomlinson .................... | 188/379 |
| 6,679,486 B2 | | 1/2004 | Muramatsu et al. | |
| 6,802,405 B2 | * | 10/2004 | Barcock et al. .............. | 188/268 |
| 7,104,372 B2 | * | 9/2006 | Dussac et al. ................. | 188/380 |
| 7,267,740 B2 | | 9/2007 | Yasumoto et al. | |
| 7,389,976 B2 | | 6/2008 | Maeno et al. | |
| 7,568,565 B2 | * | 8/2009 | McFarland et al. ........... | 188/380 |
| 7,900,449 B2 | * | 3/2011 | Trondle et al. ............... | 60/605.1 |
| 2008/0156602 A1 | | 7/2008 | Hiemenz et al. | |
| 2008/0295545 A1 | * | 12/2008 | Kim et al. ...................... | 68/23.1 |

FOREIGN PATENT DOCUMENTS

DE 3615070 A1 * 10/1987 ............. F16F 15/04

OTHER PUBLICATIONS

Machine Translation of DE 3615070 (no date).*

* cited by examiner

*Primary Examiner* — Nicholas J Lane
(74) *Attorney, Agent, or Firm* — Christopher G. Darrow; Young Basile Hanlon & MacFarlane, P.C.

(57) ABSTRACT

An apparatus is provided for reducing vibrations in a frame of a vehicle. The apparatus may include a housing component and a mass damper coupled to the housing component by a first elastic member and a second elastic member. The mass damper is configured to oscillate in a substantially vertical direction and out of phase with the frame of the vehicle. Disposed within the mass damper is a plurality of steel shots capable of movement in a relatively delayed phase with respect to the mass damper.

11 Claims, 5 Drawing Sheets

APPARATUS FOR REDUCING VIBRATIONS IN A VEHICLE

TECHNICAL FIELD

The present disclosure relates generally to the field of vibrations, and more specifically, to reducing vibrations by way of a mass damper.

BACKGROUND

In vehicles today, much emphasis may be place on reducing vibrations in various parts of the vehicle. Vibrations may be harmful to the structural integrity of the vehicle or may merely provide a nuisance to passengers. Therefore, much effort has been directed toward reducing vibrations in various parts of the vehicle in order protect the vehicle and/or provide a more comfortable passenger experience.

Currently, there exists various known means for reducing vibrations in certain vibrating members of a vehicle. One such device that can provide damping may be referred to as a dynamic damper or mass damper. A dynamic damper may have a mass connected to a vibrating member wherein the mass may be supported by a elastic member. Depending on various factors, such as the elasticity of the spring, the dynamic damper may oscillate the mass out of phase with the vibrating member. Such actions may operate to reduce the amplitudes of vibrations of the vibrating member.

However, conventional dynamic dampers may typically be focused on reducing vibrations in the powertrain of a vehicle, certain interior components of the vehicle, and/or the chassis of a vehicle. For example, a dynamic damper may be affixed to the powertrain of a vehicle to reduce vibrations resulting from the operation of an engine. Similarly, some vibration dampers may be affixed to interior elements of the vehicle such as a driver and/or passenger seat to create the feel of a smoother ride.

However, dynamic dampers have not yet fully addressed reducing vertical bending vibrations in the frame of a vehicle. Furthermore, the quality of damping that current dampers provide may still be lacking. Today, trucks are an example of the primary vehicles that still incorporate a frame as its base structure. Thus, a need exists for an apparatus to reduce vibrations in the frame of a vehicle.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides an apparatus for reducing vibrations in a vehicle. The apparatus includes a housing component with a housing receptacle and a housing lid to provide closure to the housing receptacle. The apparatus includes a mass damper including a top portion and a bottom portion, wherein the mass damper is disposed within the housing component, and wherein the mass damper is partially filled with a plurality of solid particles. The apparatus further includes a first elastic member having a first end and a second end, the first end of the first elastic member engaged with the top portion of the mass damper and the second end of the first elastic member engaged with the housing lid in a substantially vertical direction. Moreover, the apparatus includes a second elastic member having a first end and a second end, the first end of the second elastic member engaged with the bottom portion of the mass damper and a second end of the second elastic member engaged in a substantially vertical direction with the housing receptacle.

Another aspect of the present disclosure provides for an apparatus for reducing vibrations in a frame of a vehicle. The apparatus may include a housing component and a mass damper coupled to the housing component by a first elastic member and a second elastic member. The mass damper is configured to oscillate in a substantially vertical direction and out of phase with the frame of the vehicle. Disposed within the mass damper is a plurality of steel shots capable of movement in a relatively delayed phase with respect to the mass damper.

A further aspect of the present disclosure provides an apparatus for reducing vibrations in the frame of a vehicle. The apparatus includes a housing component with a top portion and a bottom portion and a mass damper is disposed within the housing component. The mass damper includes a top portion and a bottom portion, wherein the mass damper is partially filled with a plurality of metal shot. A first elastic member is coupled to the mass damper and the housing component, the first elastic member extending in a substantially upward direction from the top portion of the mass damper to the top portion of the housing component. In addition, a second elastic member is coupled to the mass damper and the housing component, the second elastic member extending in a substantially downward direction from the bottom portion of the mass damper to the bottom portion of the housing component. The apparatus further includes a retainer coupled to the top portion of the housing component and engaged with the first elastic member, the retainer operable to maintain movement of the mass damper in a substantially vertical direction.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present apparatus are described, it is to be understood that this disclosure is not limited to the particular apparatus described, as such may vary. One of ordinary skill in the art should understand that the terminology used herein is for the purpose of describing possible aspects, embodiments and/or implementations only, and is not intended to limit the scope of the present disclosure which will be limited only by the appended claims.

This disclosure is not limited in its application to the details of construction and the arrangement of components set forth in the following description or illustrated in the drawings. The disclosure is capable of other embodiments, implementations or aspects and of being practiced or of being carried out in various ways. Also, the use of "including," "comprising," "having," "containing," "involving," "consisting" and variations thereof, is meant to encompass the items listed thereafter and equivalents thereof as well as additional items.

It must also be noted that as used herein and in the appended claims, the singular forms "a," "and," and "the" may include plural referents unless the context clearly dictates otherwise. Thus, for example, reference to "a retainer" refers to one or several retainers and reference to "a method of reducing" includes reference to equivalent steps and methods known to those skilled in the art, and so forth.

Figure 1:
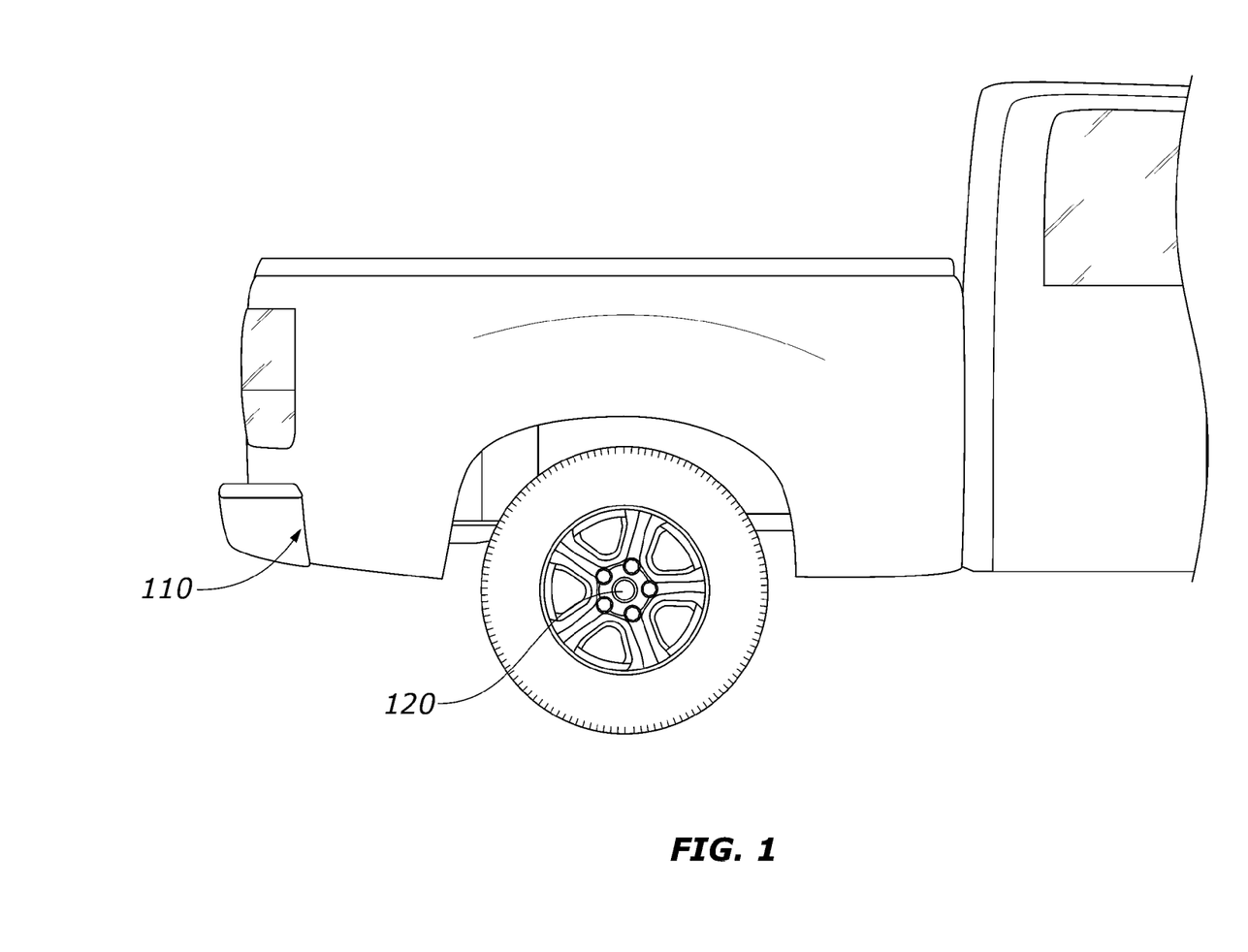
FIG. 1 illustrates an a side-view of a rear portion of a vehicle.

FIG. 1 illustrates an example of a vehicle that may employ an apparatus for reducing vibrations in accordance with one aspect of the present disclosure. The apparatus may be attached to the frame of a vehicle in proximity to a rear bumper 110 and rear wheel 120 of the vehicle. Though the apparatus for reducing vibrations may be coupled to a frame of a vehicle, specifically a truck as shown in FIG. 1, it is understood that the apparatus can have a wide range of application to any vibrating member of any vehicle.

Figure 2A:
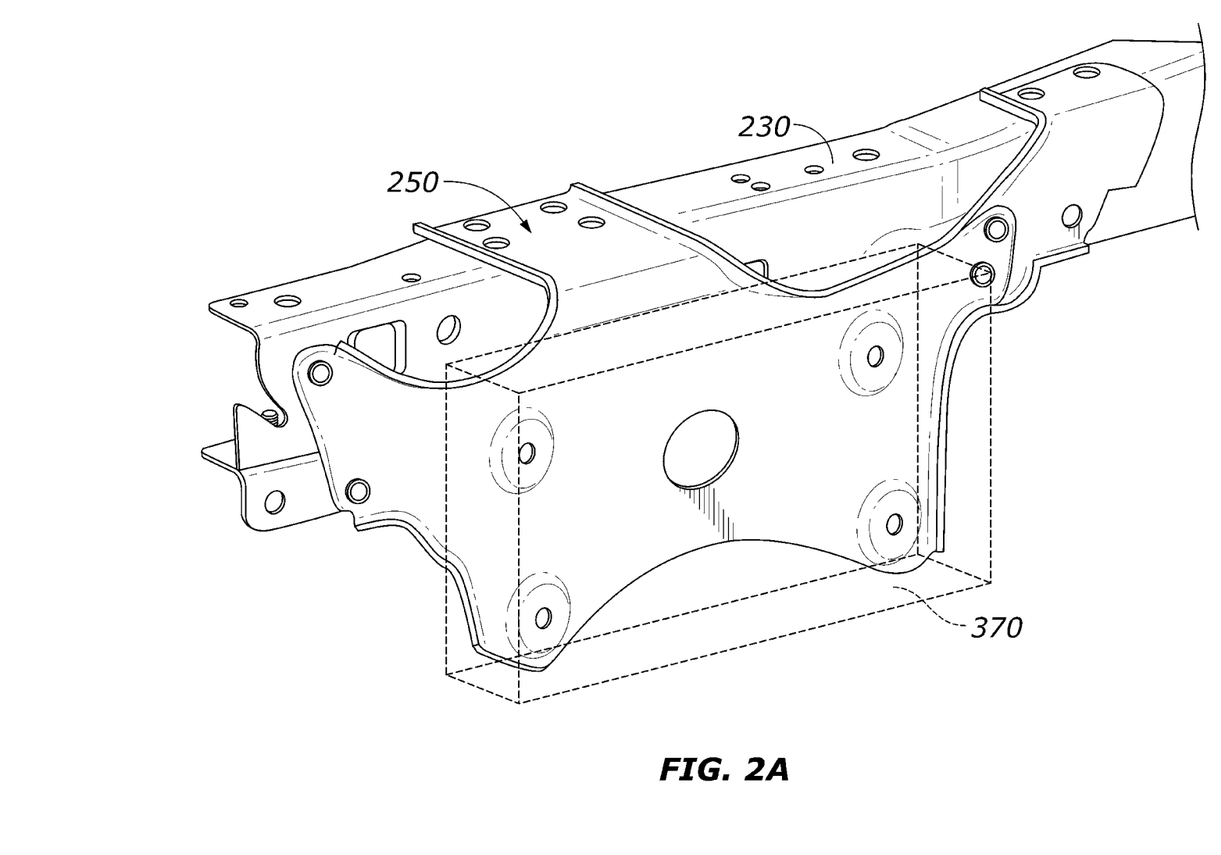
FIGS. 2A-C represent alternate views of an apparatus for reducing vibrations in a vehicle in accordance with aspects of the present disclosure.
Figure 2B:
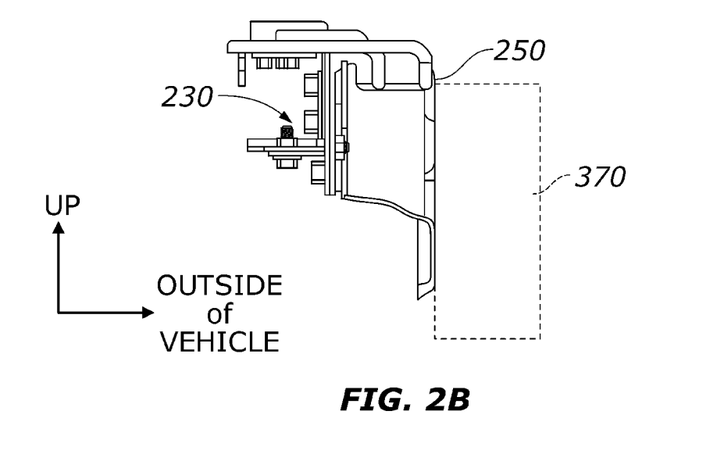
Figure 2C:
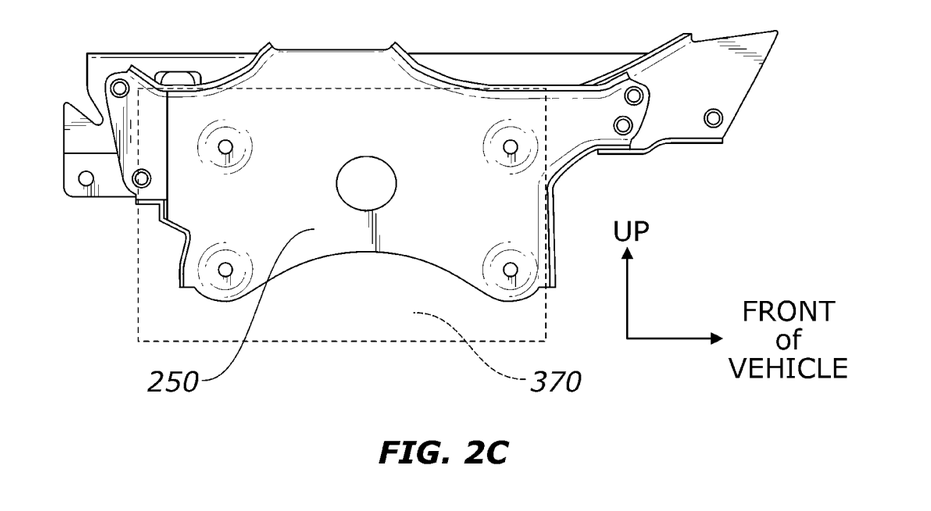

FIG. 2A-2C illustrate alternate views of an apparatus for reducing vibrations in a vehicle in accordance with one aspect of the present disclosure. Specifically, the apparatus for reducing vibrations may be mounted to the underside of the rear portion of the vehicle (not shown). FIGS. 2A-2C further provide alternate views of the mounted apparatus, such as a side view and rear view, for example.

The apparatus may include a mass damper disposed within a housing component 370. The housing component 370 may be coupled to the frame 230 of the vehicle via a frame bracket 250. In one implementation, the housing component 370 may be bolted to the frame bracket 250, and the frame bracket 250 may be coupled to the frame 230 via a bolting means, for example. The mass damper may move out of phase relative to the frame 230 as will be discussed below. Furthermore, the height of the housing component 370 may reside in a substantially vertical position relative to the ground so as to reduce vertical vibrations that may occur in the frame 230.

Figure 3A:
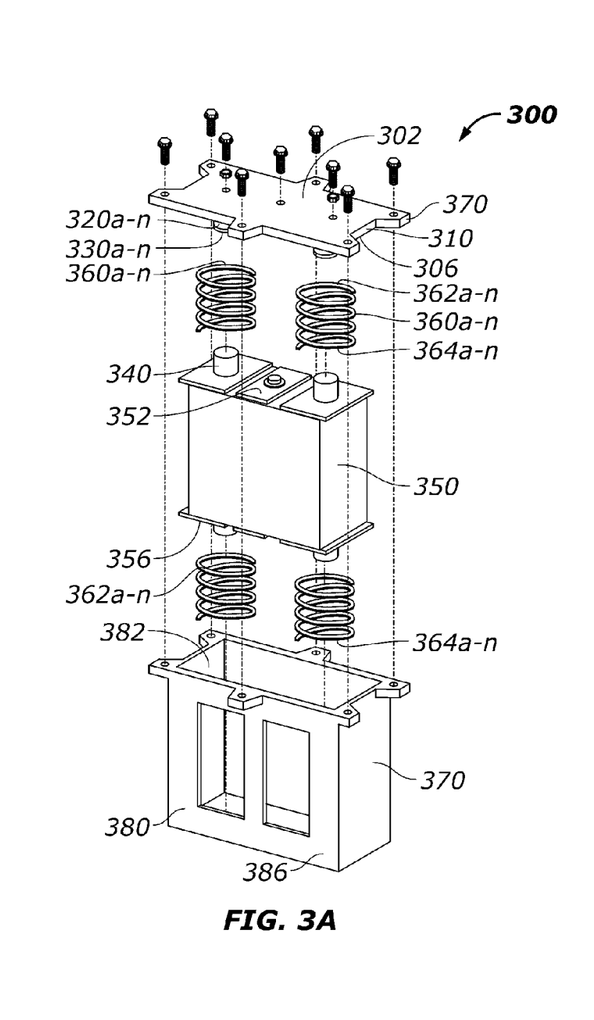
FIG. 3A represents an exploded view of the apparatus of FIGS. 2A-C.

FIG. 3A represents an exploded view of an apparatus, indicated generally at 300, for reducing vibrations in a vehicle. As such, the apparatus 300 may be coupled to a vibrating member (not shown) of the vehicle. In one implementation, the apparatus 300 may be coupled to a frame (i.e., the vibrating member) of a vehicle to reduce vibrations in the frame. In another implementation, the apparatus may specifically be coupled to the frame of the vehicle in proximity to a rear wheel and rear bumper, as shown in FIGS. 1-2.

The apparatus 300 may include a housing component 370 that encloses a mass damper 350. As depicted in FIG. 3A, the housing component 370 may be of a generally rectangular shape and may be fabricated from any metallic material. Additionally, the housing component 370 may comprise both a housing lid 310 and a housing receptacle 380. The housing receptacle 380 may include an open end 382 and a bottom end 386. Furthermore, the housing lid 310 may engage the open end 382 of the housing receptacle 380 such that the housing lid 310 provides closure to the open end 382. As such, the housing lid 310 may comprise an inner surface 306 and an outer surface 302, of which the inner surface 306 faces the bottom end 386 of the housing receptacle 380, and the outer surface 302 remains exposed to the environment or provides a surface for attachment to a vehicle.

In addition, the housing component 370 may enclose the mass damper 350 in order to prevent exposure of the mass damper 350 to external environmental conditions. For example, the housing component 370 may protect the mass damper 350 from conditions such as snow, rain, dust, mud, and/or the like from accumulating on the mass damper 350 and altering its weight. Notably, a change in the mass damper's weight may significantly alter its performance and function by affecting its resonance frequency as described below. In addition, the housing component 370 may be operable to reduce the noise emitted by the mass damper 350 during operation.

The mass damper 350, disposed within the housing component 370, may comprise a top portion 352 and a bottom portion 356. Moreover, the mass damper 350 may be coupled to elastic members 360a-n. As depicted in FIG. 3A, a first pair of elastic members 360a-n may each have a first end 362a-n coupled to the top portion 352 of the mass damper 350. Furthermore, the first pair of elastic members 360a-n may have a second end 364a-n coupled to the inner surface 306 of the housing lid 310 such that the first pair of elastic members 360a-n extends in a substantially upward direction from the top portion of the mass damper 350 to the inner surface 306 of the housing lid 310.

Conversely, a second pair of elastic members 360a-n may each have a first end 362a-n coupled to the bottom portion 356 of the mass damper 350. Furthermore, the second pair of elastic members 360a-n may have a second end 364a-n coupled to the bottom end 386 of the housing receptacle 380 such that the second pair of elastic members 360a-n extends in a substantially downward direction from the bottom portion 356 of the mass damper 350 to the bottom end 386 of the housing receptacle 380.

Furthermore, the elastic members 360a-n may have a certain associated elasticity. As used herein, elasticity may measure the ability of the elastic members 360a-n to return to their original shapes after being stretched or compressed. To this end, the elasticity of the elastic members 360a-n may depend on application of the apparatus 300. For example, if the apparatus 300 is coupled to frame of a truck, Thus, the mass damper 350 may be operable to oscillate within the housing component 370 in a substantially vertical direction via the elastic members 360a-n. For example, while the mass damper 350 moves in a substantially upward direction relative to the housing component 370, the first pair of elastic members 360a-n may be compressed while the second pair of elastic members 360a-n may expand. On the other hand, the reverse may be true when the mass damper 350 moves in a substantially downward direction relative to the housing component 370.

In one implementation, the elastic members 360a-n may be flat wire coil springs. In flat wire coil springs, the coils may have flat surfaces such that when the spring is fully compressed, the flat surfaces of the coil are in contact with each other. Compared to typical coil springs which may have coils with a rounded surface, having flat surfaces may reduce pressure on the coils when fully compressed. Thus, using a flat-wire coil spring may increase the durability of the spring compared to a typical coil spring. Furthermore, it should be noted that while FIG. 3A illustrates the apparatus as having two elastic members 360a-n coupled to the top portion 352 of the mass damper 350, any number of elastic members 360a-n may be employed. Similarly, any number of elastic members 360a-n may be coupled to the bottom portion 356 of the mass damper 350.

To ensure that the mass damper 350 moves in a substantially vertical direction, a first pair of retainers 320a-n may be coupled to the inner portion 306 of the housing lid 310. The first pair of retainers 320a-n may be of a smaller diameter than that of the elastic members 360a-n and may be operable to engage the first pair of elastic members 360a-n. Similarly, though not pictured, a second pair of retainers 320a-n may be coupled to the bottom end 386 of the housing receptacle 380 on the inside of the receptacle 380. The second pair of retainers 320a-n may be operable to engage the second pair of elastic members 360a-n.

In implementations where the elastic members 360a-n are flat-wire coil springs, the retainers 320a-n may be disposed within the diameter of springs. Thus, the retainers 320a-n may stabilize the flat-wire coil springs (i.e., the elastic members 360a-n by preventing them from moving beyond the diameter of the retainers 320a-n during extreme road conditions and/or maneuvering of the vehicle such as off-road driving, emergency handling maneuvers, and/or the like. As a result, the retainers 320a-n may maintain the elastic members 360a-n in a substantially vertical position and thereby minimize any longitudinal or lateral movement by the elastic members 360a-n and/or the mass damper 350.

In addition, the flat-wire springs may be operable to regulate the movement or stroke of the dynamic damper 350. For example, when fully compressed, flat-wire springs may possess a certain block height that defines the height of the spring when fully compressed. Because the flat-wire spring may not be compressed beyond its block height, the dynamic damper may similarly be prevented from oscillating beyond the spring's block height while enclosed in the housing component 370. For example, both the upward movement and the downward movement of the mass damper 350 may be limited by the first pair of elastic members 360a-n and the second pair of elastic members 360a-n, respectively. Thus, the flat-wire spring may function to both enable the oscillation of the dynamic damper 350 and to regulate its oscillation.

Optionally, in implementations using flat-wire coil springs, the apparatus 300 may include additional components to further limit the movement of the mass damper 350 beyond the block height of the flat-wire coil springs. To this end, a first pair of stopper cushions 340a-n may be coupled to the top portion 352 of the mass damper 350 such that the stopper cushions 340a-n are positioned within the coils of the first pair of elastic members 360a-n. The stopper cushions may be manufactured from any form of energy absorbing material such as rubber, foam, and/or the like.

Furthermore, the first pair of retainers 320a-n may include a first pair of stopper plates 330a-n operable to receive the first pair of stopper cushions 340a-n during an upward movement by the mass damper 350. Thus, the first pair of stopper cushions 340a-n may engage the first pair of stopper plates 330a-n such that upward movement of the mass damper 350 is stopped before the first pair of elastic members 360a-n is fully compressed to their block heights. Similarly a second pair of stopper cushions may be coupled to the bottom portion 356 of the mass damper 350 and positioned within the coils of the second pair of elastic members 360a-n. As such, the second pair of stopper cushions 340a-n may engage a second pair of stopper plates 330a-n, included on the second pair of retainers 320a-n, to further limit downward movement of the mass damper 350.

Turning attention now to the movement of the mass damper 350, the oscillation of the mass damper 350 within the housing component 370 may be operable to reduce the vibrations in a vibrating member of the vehicle such as the frame of the vehicle. Notably, the frame may have a resonance frequency associated with its oscillation/vibration. Resonance may refer to the tendency of an object or system to oscillate at its maximum amplitude during certain frequencies, i.e., resonance frequencies. Therefore, it is generally desirable to prevent the vibrating member from oscillating at its associated resonance frequency to avoid vibrations with large amplitudes. As such, the mass damper 350 may be configured to a certain weight, and the coupled elastic members 360a-n may be configured with a certain elasticity so that resonance frequency of the mass damper 350 matches that of the vibrating member.

To this end, oscillations in the frame of the vehicle may be transferred to the mass damper 350 by way of the elastic members 360a-n. The transfer of such an oscillation may cause the elastic members 360a-n to deform and the mass damper 350 to oscillate out of phase relative to the vibrating member. For example, during oscillation, if the vibrating member is moving in an upwards direction, the mass damper 350 may be configured to move in a downwards direction. Conversely, if the vibrating member is moving in a downwards direction, the mass damper 350 may be configured to respond by moving an upwards direction. Thus, the mass damper 350 may be operable to reduce the amplitude of oscillation in the vibrating member (i.e., damping) by continuously providing a force in the opposite direction of the vibrating member's movement.

In order to reduce the amplitude in oscillation of the mass damper 350 itself, however, a plurality of solid particles may be disposed within the mass damper 350. As such, the mass damper 350 may be partially filled with the solid particles such that when the mass damper 350 resides in an idle position (i.e., it is not moving) a gap of air may be defined inside the mass damper 350 between top portion 352 and the solid particles. In other words, the mass damper 350 may not be completely filled with the solid particles so that the solid particles may be operable to move relative to the mass damper. Thus, upon input of vibrations in the vibrating member, the solid particles may be forced to move relative to the mass damper 350 in the direction of the vibration. A vibration damping effect (i.e., a reduction in the vibrations of the vibrating member) may be achieved through energy loss due to collisions of the solid particles against the walls of the mass damper 350.

In one implementation, the solid particles may be steel shot, two millimeters in diameter. It should be noted that the solid particles may comprise any other type of material and is not limited to steel shot. For example, any other type of metal shot may also be employed.

Figure 3B:
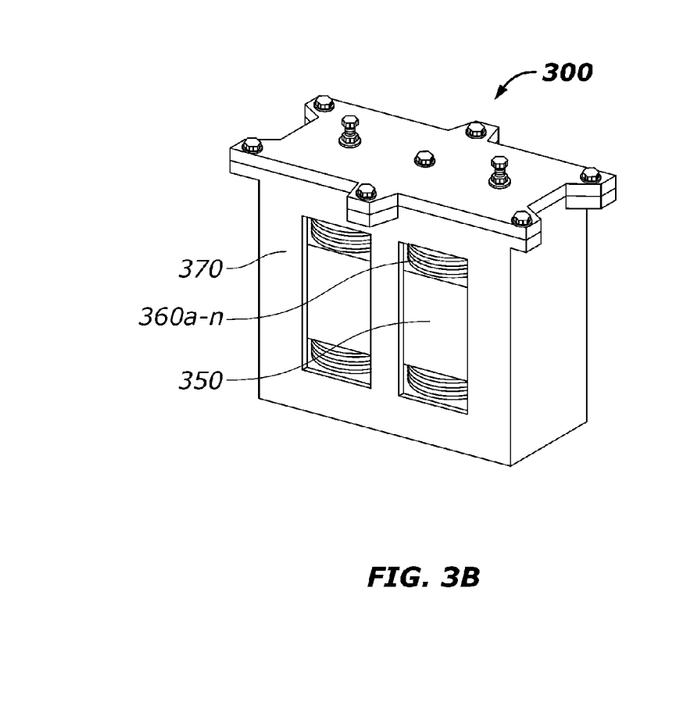
FIG. 3B represents an assembled view of the apparatus of FIGS. 2A-C.

FIG. 3B represents an assembled view of the apparatus 300 in FIG. 3A. As depicted, the mass damper 350 may be enclosed within the housing component 370. The housing component itself 370 may have its open end 382 covered by the housing lid 310. Furthermore, the mass damper 350 may be disposed within the housing component 370 in a position such that the elastic members 360a-n are in a preloaded, i.e., compressed position. Thus, the mass damper 350 may be operable to counter or reduce vibrations of small amplitude that may occur in a frame of a vehicle.

Figure 4A:
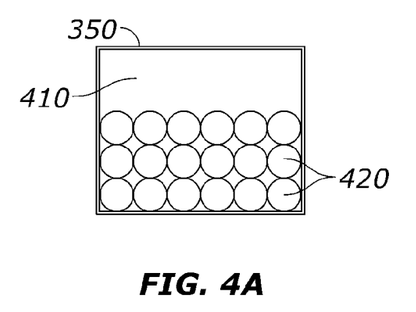
FIGS. 4A-E represent schematics illustrating the movement of the apparatus of FIGS. 2A-C.
Figure 4B:
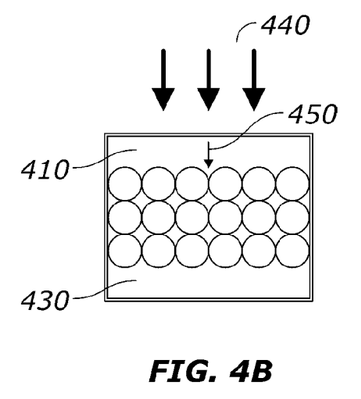

FIG. 4A-4E represents schematics illustrating the movement of solid particles in the mass damper in accordance with one aspect of the present disclosure. In FIG. 4A, the mass damper 350 is partially filled with the solid particles 420. As such, a gap of air 410 is defined inside the mass damper 350 between the top end of the mass damper 350 and the solid particles 420. In FIG. 4B, the mass damper 350 has begun movement in a downward direction, indicated by three downward arrows 440. Due to the gap of air 410, the solid particles 420 may have begun its downward movement at a delayed interval relative to the mass damper 350, indicated by a single downward arrow 450. Such a delayed interval by the solid particles 420 may be referred to as a phase lag. As such, the solid particles 420 move in a delayed phase relative to the mass damper 350. As a result, in FIG. 4B, the solid particles 420 may be disposed within the mass damper 350 such that a gap of air 410 is defined between the top end of the mass damper 250 and the solid particles, and another gap of air 430 is defined between the solid particles 420 and the bottom end of the mass damper 350.

Figure 4C:
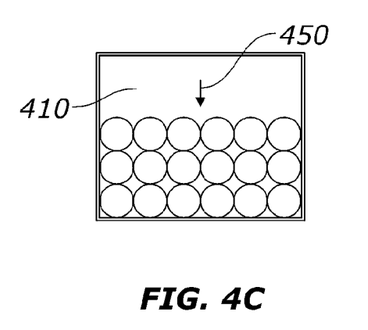
Figure 4D:
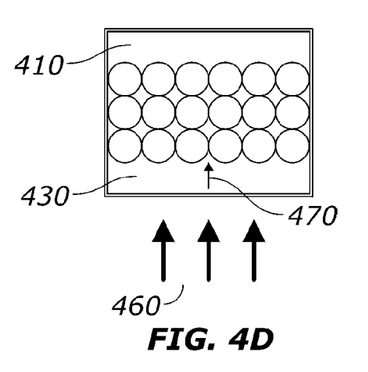

In FIG. 4C, the mass damper 350 has completed its downward movement of its oscillation and may be ready to begin upward movement. The solid particles 420, however, may still be moving downwards and may impact the bottom end of the mass damper 350. As a result of the impact, the upward movement of the mass damper 350 may be slowed/delayed such that the amplitude of the mass damper 350 is reduced. In effect, the solid particles 420 may provide damping for the mass damper. Such damping may be needed to limit preresonance and post-resonance vibrations. In FIG. 4D, the mass damper 350 may have begun upward movement, indicated by the three upward arrows 460. Again, because the solid particles 420 may move in a relatively delayed phase with respect to the mass damper 350, the solid particles 420 may have started its upward ward movement after the mass damper 350. Thus, the solid particles 420 may be disposed within the mass damper 350 such that a gap of air 410 may be defined between the solid particles 420 and the top end of the mass damper 350, and another gap of air 430 may be defined between the solid particles 420 and the bottom end of the mass damper 350.

Figure 4E:
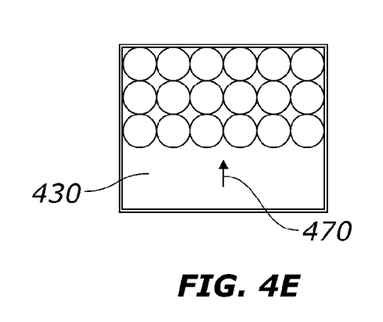

Subsequently, in FIG. 4E, the mass damper 350 may have completed its upward movement and may be ready to again begin downward movement. The solid particles 420, however, may still be moving upwards and may strike the top end of the mass damper 350. Again, such impact may reduce the oscillation of the mass damper. Thereafter, the mass damper may again begin downward movement corresponding to step FIG. 4B.

Therefore, the present disclosure provides an apparatus to reduce vibrations in a vehicle. The apparatus may be coupled to a vibrating member of the vehicle such as the frame and may include a mass damper configured to oscillate out of phase with the frame. Furthermore, the mass damper may include a plurality of solid particles (e.g., steel shots) that move in a relatively delayed phase with respect to the mass damper. Thus, the solid particles may reduce further reduce the oscillation of the mass damper itself.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. An apparatus for reducing vibrations in a vehicle, the apparatus comprising:
    a housing component including a housing receptacle and a housing lid to provide closure to the housing receptacle;
    a mass damper including a top portion and a bottom portion, wherein the mass damper is disposed within the housing component, and wherein the mass damper is partially filled with a plurality of solid particles such that a gap is defined within the mass damper so the solid particles move in a delayed phase relative to the mass damper;
    a first elongated elastic member having a first end and a second end, the first end of the first elastic member engaged with the top portion of the mass damper and the second end of the first elastic member engaged with the housing lid in a substantially vertical direction, the first elastic member having a first elastic member block height; and
    a first retainer coupled to the housing lid and disposed within the first elastic member, the first retainer including a first layer and a second layer distinct from the first layer, the first layer disposed between the second layer and the housing lid, the second layer including a first stopper plate disposed at a distal end of the first retainer and engageable with a first stopper cushion coupled to the top portion of the mass damper, wherein the first stopper plate and the first stopper cushion are disposed within the first elastic member and the first stopper cushion engages the first stopper plate to stop upward movement of the mass damper before the first elastic member is fully compressed.

2. The apparatus of claim 1, wherein the housing component is coupled to a frame of a vehicle in proximity to a rear wheel and a rear bumper of the vehicle and wherein the mass damper moves out of phase with the frame.

3. The apparatus of claim 1, wherein the first retainer is operable to maintain movement of the first elastic member in a substantially vertical direction.

4. The apparatus of claim 1 further comprising:
    a second elongated elastic member having a first end and a second end, the first end of the second elastic member engaged with the bottom portion of the mass damper and the second end of the second elastic member engaged in a substantially vertical direction with the housing receptacle, the second elastic member having a second elastic member block height;
    a second retainer coupled to the housing receptacle and disposed within the second elastic member, the second retainer including a first layer and a second layer distinct from the first layer, the first layer of the second retainer disposed between the second layer of the second retainer and the housing lid, the second layer of the second retainer including a second stopper plate disposed at a distal end of the second retainer and engageable with a second stopper cushion coupled to the bottom portion of the mass damper, wherein the second stopper plate and the second stopper cushion are disposed within the second elastic member and the second stopper cushion engages the second stopper plate to stop downward movement of the mass damper before the second elastic member is fully compressed.

5. The apparatus of claim 4, wherein each of the first elastic member and the second elastic member is a flat-wire spring.

6. The apparatus of claim 1, wherein the delayed phase comprises movement of the mass damper in opposition to movement of the solid particles.

7. An apparatus for reducing vibrations in the frame of a vehicle, the frame having an outwardly oriented face, an inwardly oriented face and an elongated horizontal dimension, the apparatus comprising:
    a housing component;
    a mass damper coupled to the housing component by a first elastic member and a second elastic member, the mass damper configured to oscillate in a substantially vertical direction and out of phase with the frame of the vehicle;

a plurality of steel shots disposed within the mass damper such that a gap is defined within the mass damper, wherein the plurality of steel shots move in a relatively delayed phase with respect to the mass damper, and wherein the delayed phase comprises movement of the mass damper in opposition to movement of the plurality of steel shots;

a first retainer coupled to a housing lid, the first retainer including a first layer and a second layer distinct from the first layer, the second layer of the first retainer including a first stopper plate disposed at a distal end of the first retainer;

a second retainer coupled to a housing receptacle, the second retainer including a first layer and a second layer distinct from the first layer, wherein the first retainer is disposed within the first elastic member and the second retainer is disposed within the second elastic member so that the first and second retainers are operable to maintain movement of the respective first elastic member and the second elastic member in a substantially vertical direction; and a first stopper cushion coupled to a top portion of the mass damper, wherein the first stopper cushion is operable to engage the first stopper plate to stop an upward movement of the mass damper before the first elastic member is fully compressed, and wherein the first stopper cushion and first stopper plate are disposed within the first elastic member.

8. The apparatus of claim 7, wherein the housing component is coupled to the frame of the vehicle in proximity to a rear wheel and a rear bumper of the vehicle.

9. The apparatus of claim 7, wherein the first elastic member and the second elastic member comprise a flat-wire spring.

10. The apparatus of claim 7, wherein a downward movement of the mass damper is limited by a block height of the second elastic member, a first end of the second elastic member engaged with a bottom portion of the mass damper and a second end of the second elastic member engaged with the housing receptacle.

11. The apparatus of claim 7, wherein the second layer of the second retainer includes a second stopper plate disposed at a distal end of the second retainer; and a second stopper cushion coupled to a bottom portion of the mass damper, wherein the second stopper cushion is operable to engage the second stopper plate to stop a downward movement of the mass damper before the second elastic member is fully compressed, the second stopper cushion and the second stopper plate are each disposed within the second elastic member.

* * * * *